United States Patent
Chan et al.

(10) Patent No.: US 9,225,834 B2
(45) Date of Patent: Dec. 29, 2015

(54) CONTACT CENTER SKILLS MODELING USING CUSTOMER RELATIONSHIP MANAGEMENT (CRM) INCIDENT CATEGORIZATION STRUCTURE

(71) Applicant: ORACLE INTERNATIONAL CORPORATION, Redwood Shores, CA (US)

(72) Inventors: Victor Chung-Wai Chan, Saratoga, CA (US); Peter S. Tung, Redwood Shores, CA (US); Justin Hamson, Penfield, NY (US); Devin Herron, Fairport, NY (US); Alice Wack, Pittsford, NY (US); W. Scott Seebauer, San Diego, CA (US)

(73) Assignee: ORACLE INTERNATIONAL CORPORATION, Redwood Shores, CA (US)

(*) Notice: Subject to any disclaimer, the term of this patent is extended or adjusted under 35 U.S.C. 154(b) by 0 days.

(21) Appl. No.: 13/903,141

(22) Filed: May 28, 2013

(65) Prior Publication Data

US 2014/0355750 A1  Dec. 4, 2014

(51) Int. Cl.
*H04M 3/00* (2006.01)
*H04M 3/523* (2006.01)
*H04M 3/51* (2006.01)

(52) U.S. Cl.
CPC .......... *H04M 3/5233* (2013.01); *H04M 3/5175* (2013.01)

(58) Field of Classification Search
CPC ............... H04M 3/5233; H04M 2203/402; H04M 2203/2061; H04M 3/5235; H04M 2203/408; G06Q 10/063112

USPC ............ 379/265.01, 265.02, 265.05, 265.06, 379/265.07, 265.08, 265.09, 265.1, 265.11, 379/265.12, 265.13, 265.14, 266.01, 379/266.02, 266.03

See application file for complete search history.

(56) References Cited

U.S. PATENT DOCUMENTS

| | | |
|---|---|---|
| 5,825,869 A | 10/1998 | Brooks et al. |
| 6,163,607 A | 12/2000 | Bogart et al. |
| 6,173,053 B1 | 1/2001 | Bogart et al. |

(Continued)

OTHER PUBLICATIONS

ACD Processing, http://www.crmmarketplace.com/doc.mvc/ACD-Processing-ICs-Automatic-Communication-Di-0001.

(Continued)

*Primary Examiner* — Antim Shah
(74) *Attorney, Agent, or Firm* — Kilpatrick Townsend & Stockton LLP (57) ABSTRACT

Embodiments of the invention provide systems and methods for modeling of agent skills based on or more closely matching categorization structures of the CRM system. According to one embodiment, defining skills of each of a plurality of customer service agents in a Customer Relationship Management (CRM) system can comprise defining a set of product information representing products or services for which support is available through the CRM system. A set of incident information representing incidents handled by the CRM for one or more of the products or services can also be defined and a structure of the incident information can be based on a structure of the product information. A set of skills information for each of the plurality of customer service agents can also be defined. A structure of the skills information can be based on the structure of the product information and the structure of the incident information.

19 Claims, 6 Drawing Sheets

(56) References Cited

U.S. PATENT DOCUMENTS

| | | | |
|---|---|---|---|
| 6,408,066 B1 * | 6/2002 | Andruska et al. | 379/265.12 |
| 6,459,787 B2 | 10/2002 | McIllwaine et al. | |
| 6,633,640 B1 | 10/2003 | Cohen et al. | |
| 8,238,541 B1 * | 8/2012 | Kalavar | 379/265.06 |
| 2003/0103618 A1 * | 6/2003 | Brown et al. | 379/265.09 |
| 2008/0037761 A1 | 2/2008 | Cordell et al. | |
| 2008/0205625 A1 * | 8/2008 | Mandalia et al. | 379/265.02 |

OTHER PUBLICATIONS

Call Center Metrics, http://c.ymcdn.com/sites/www.naquitline.org/resource/resmgr/issue_papers/callcentermetricspaperstaffi.pdf.
Contact Center Lexicon, http://www.globalresponse.com/resource-center/the-call-center-glossary/.
Scorecard Routing, http://www.transerainc.com/downloads/WP_Three_Data_Points_Key_to_Contact_Center_Performance.pdf.

* cited by examiner

CONTACT CENTER SKILLS MODELING USING CUSTOMER RELATIONSHIP MANAGEMENT (CRM) INCIDENT CATEGORIZATION STRUCTURE

BACKGROUND OF THE INVENTION

Embodiments of the present invention relate generally to methods and systems for modeling of agent skills in a Customer Relationship Management System (CRM) and more particularly to a model based on or more closely matching categorization structures of the CRM system.

Customer Relationship Management (CRM) systems provide support for customers of a product or service by allowing those users to make requests for service that can include a question posed by the user related to the product or service. For example, a user may log onto or access a CRM system provided by a manufacturer of cellphones and request information related to use of that device and that may include a question such as "How do I adjust the brightness of the display?" Generally speaking, these systems receive requests for service, e.g., in the form of a phone call, web page form, instant message, email, etc., and route the requests to a human agent for addressing the request and providing an answer to the question. In many cases, the agent is selected based on the topic of the question or request and a predefined profile of that agent that includes indications of the agent's skills and/or expertise. This skills-based route can be done by an Automated Call Distribution (ACD) system that is either part of or separate from the CRM system.

Traditional ACD systems offering skills-based routing capabilities model skills in a generic way decoupled from the CRM system. This leads to inefficiencies when integrating the two systems. For example, as a consumer first visits a vendor's website to search for solutions related to a product type and/or issue type, and then subsequently the consumer requests to chat with a live agent, the contact center has to translate the product/issue information expressed by the consumer into a skill definition understood by the skills-based routing system. This translation is done via manually configured business rules that are complex to manage and can easily get out of date as new products and issues are added to the system. Furthermore, as agents work on many incidents related to specific products and/or issue types, there is no way to directly correlate the agent's performance on those incidents back to the skills definition for that agent. Thus, the agent's skill level score must also be manually configured and again can easily get out of date. Also, because the administrator has to manually manage the set of skills and maintain the agents' skills score per skill, the set of skills must be kept at a small and manageable size (e.g. 12-20 skills). Hence, there is a need for improved methods and systems for modeling of agent skills based on or more closely matching categorization structures of the CRM system.

BRIEF SUMMARY OF THE INVENTION

Embodiments of the present invention are directed to defining agent skills in a Customer Relationship Management (CRM) system by leveraging the CRM incident categorization structure (e.g. the product hierarchy and category hierarchy) to allow one to define a manageable set of skills that cover a product set. Customer inquiries pertaining to any node of the CRM categorization structure (whether a high level branch node or a granular leaf node) can be mapped to a defined skill via an algorithm that crawls up the CRM categorization structure to find the closest matching skill. The identified skill can then be used to select an agent. As new products are added to the product hierarchy, there is no need to update the skill definitions. Rather, the algorithm would automatically map the new products to an existing skill. Since the skills and the incidents can be modeled using the same structure, the agent's score for a particular skill can be derived from the agent's performance on incidents of the same type. Thus, it is possible to automate the agent scoring process by dynamically calculating the agent's skill scores, rather than relying on statically defined skill scores.

Stated another way, embodiments of the invention provide systems and methods for modeling of agent skills based on or more closely matching categorization structures of the CRM system. According to one embodiment, defining skills of each of a plurality of customer service agents in a Customer Relationship Management (CRM) system can comprise defining a set of product information representing products or services for which support is available through the CRM system. A set of incident information representing customer incidents handled by the CRM for one or more of the products or services can also be defined and a structure of the incident information can be based on a structure of the product information. A set of skills information for each of the plurality of customer service agents can also be defined. A structure of the skills information can be based on the structure of the product information and the structure of the incident information.

For example, the structure of the product information can comprises a multi-level hierarchy wherein lower levels of the hierarchy comprise more detailed information about the products or services than higher levels of the hierarchy. The structure of the incident information can also comprise a multi-level hierarchy, wherein the structure of the incident information is substantially similar to the structure of the product information, wherein the incident information maps to the product information, and wherein lower levels of the hierarchy comprise more detailed information about the customer incidents than higher levels of the hierarchy. The skills information can be expressed in terms based on the structure of the product information and the structure of the incident information.

Information can be received related to a customer incident and based on an interaction with a customer. A customer intent can be determined based on the information related to the customer incident and the interaction with the customer. The customer intent can be expressed in terms based on the structure of the product information and the structure of the incident information. A communication with the customer can be routed to a selected at least one of the plurality of customer service agents based on the determined customer intent and skills information for the selected customer service agent. For example, routing can comprise comparing the determined customer intent to the skills information for the plurality of customer service agents. In response to identifying an exact match between the customer intent and the skills information for at least one of the plurality of customer service agents based on the comparing, the at least one of the plurality of customer service agents having the exact match can be selected for handling of the communication with the customer. In response to identifying a partial match between the customer intent and the skills information for at least one of the plurality of customer service agents based on the comparing, the at least one of the plurality of customer service agents can be selected for handling of the communication with the customer based on having an exact match for one of product information or category information expressed in the customer intent and a best match for the other of product information or category information expressed in the customer intent. In response to identifying no match between the customer intent and the skills information for at least one of the plurality of customer service agents based on the comparing, the at least one of the plurality of customer service agents can be selected for handling of the communication with the customer based on having a best match for product information and category information expressed in the customer intent.

According to one embodiment, performance of a customer service agent in handling a communication with a customer can be dynamically scored. Dynamically scoring performance of the customer service agent in handling the communication with the customer can comprise receiving information related to handling of a customer incident, identifying a customer service agent based on the received information, determining agent skills related to handling of the incident based on the received information, determining agent performance based for the incident based on the received information, and updating the skills information for the identified customer service agent based on the determined agent performance.

DETAILED DESCRIPTION OF THE INVENTION

In the following description, for the purposes of explanation, numerous specific details are set forth in order to provide a thorough understanding of various embodiments of the present invention. It will be apparent, however, to one skilled in the art that embodiments of the present invention may be practiced without some of these specific details. In other instances, well-known structures and devices are shown in block diagram form.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the invention as set forth in the appended claims.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "machine-readable medium" includes, but is not limited to portable or fixed storage devices, optical storage devices, wireless channels and various other mediums capable of storing, containing or carrying instruction(s) and/or data. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

Embodiments of the invention provide systems and methods for modeling of agent skills based on or more closely matching categorization structures of the CRM system. More specifically, embodiments of the present invention provide for modeling agent skills using hierarchies defined in the CRM such as product and category hierarchies. Since administrators of the CRM system already use such hierarchies to classify and organize incidents and answers, it would be a logical extension for them to use this hierarchy to model agent skills. Thus, embodiments of the present invention provide for modeling of interaction purpose and agent skills using the model used in the CRM system to categorize incidents and knowledge base articles. Embodiments can also provide an algorithm to lookup a defined agent skill using the product/category and/or other information obtained from the consumer, i.e., the interaction purpose. Additionally or alternatively, embodiments can provide for dynamically tabulating agent skill scorecards that can be used in real-time skills based routing (agent assignment) decisions. Thus, when the agent skills are modeled after how incidents are categorized, the agent's performance on each type of incident can be directly correlated to their skills score.

In this way, definition of agent skills can be completed more easily and quickly by leveraging existing product and category or other definitions of the CRM. The hierarchies of the CRM can provide a convenient taxonomy for defining high level skills and a skills-based agent selection service can include an algorithm to map any detailed product/category or other hierarchy instance to the most relevant skill defined in the system. Again, this allows the contact center to define a finite and manageable set of skills which can be managed by human beings, while providing coverage for up to the entire product set, as well as allows the product set to grow without requiring an update to the skill definitions. For example, if skills are defined at the level of mobile devices, an administrators or other user does not need to update the skills definitions for agents when a new model of mobile device is introduced because when the product tree the algorithm can map issues with this device to the "mobile" skill. As noted, embodiments can provide automatic scoring of an agent's skills by tracking performance on each type of incident. This information can be used to provide more accurate and more up-to-date agent assignment decisions than traditional skills based routing based on static agent skill scores configured by an administrator. Various additional details of embodiments of the present invention will be described below with reference to the figures.

Figure 1:
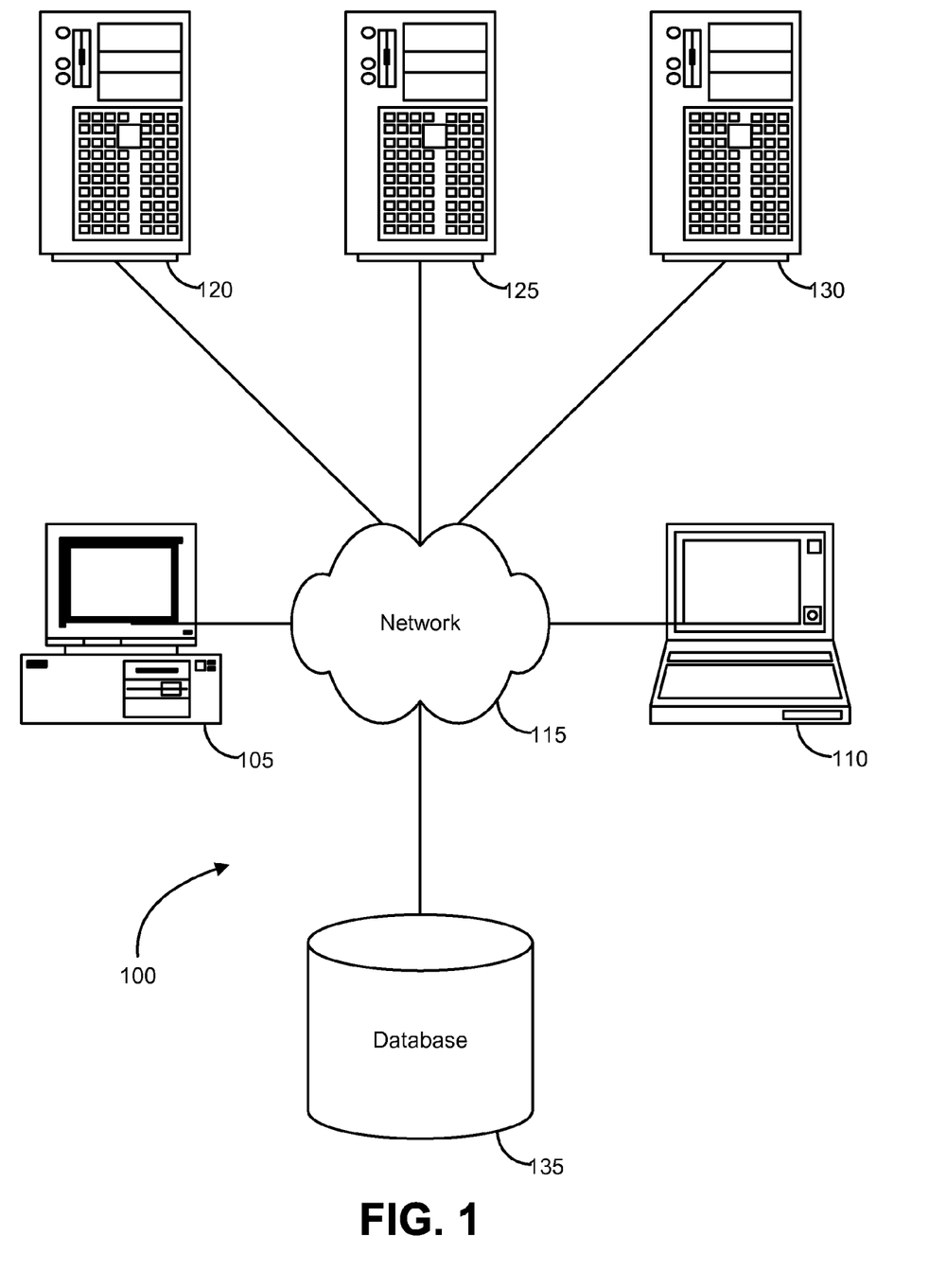
FIG. 1 is a block diagram illustrating components of an exemplary operating environment in which various embodiments of the present invention may be implemented.

FIG. 1 is a block diagram illustrating components of an exemplary operating environment in which various embodiments of the present invention may be implemented. The system 100 can include one or more user computers 105, 110, which may be used to operate a client, whether a dedicate application, web browser, etc. The user computers 105, 110 can be general purpose personal computers (including, merely by way of example, personal computers and/or laptop computers running various versions of Microsoft Corp.'s Windows and/or Apple Corp.'s Macintosh operating systems) and/or workstation computers running any of a variety of commercially-available UNIX or UNIX-like operating systems (including without limitation, the variety of GNU/Linux operating systems). These user computers 105, 110 may also have any of a variety of applications, including one or more development systems, database client and/or server applications, and web browser applications. Alternatively, the user computers 105, 110 may be any other electronic device, such as a thin-client computer, Internet-enabled mobile telephone, and/or personal digital assistant, capable of communicating via a network (e.g., the network 115 described below) and/or displaying and navigating web pages or other types of electronic documents. Although the exemplary system 100 is shown with two user computers, any number of user computers may be supported.

In some embodiments, the system 100 may also include a network 115. The network may can be any type of network familiar to those skilled in the art that can support data communications using any of a variety of commercially-available protocols, including without limitation TCP/IP, SNA, IPX, AppleTalk, and the like. Merely by way of example, the network 115 maybe a local area network ("LAN"), such as an Ethernet network, a Token-Ring network and/or the like; a wide-area network; a virtual network, including without limitation a virtual private network ("VPN"); the Internet; an intranet; an extranet; a public switched telephone network ("PSTN"); an infra-red network; a wireless network (e.g., a network operating under any of the IEEE 802.11 suite of protocols, the Bluetooth protocol known in the art, and/or any other wireless protocol); and/or any combination of these and/or other networks such as GSM, GPRS, EDGE, UMTS, 3G, 2.5 G, CDMA, CDMA2000, WCDMA, EVDO etc.

The system may also include one or more server computers 120, 125, 130 which can be general purpose computers and/or specialized server computers (including, merely by way of example, PC servers, UNIX servers, mid-range servers, mainframe computers rack-mounted servers, etc.). One or more of the servers (e.g., 130) may be dedicated to running applications, such as a business application, a web server, application server, etc. Such servers may be used to process requests from user computers 105, 110. The applications can also include any number of applications for controlling access to resources of the servers 120, 125, 130.

The web server can be running an operating system including any of those discussed above, as well as any commercially-available server operating systems. The web server can also run any of a variety of server applications and/or mid-tier applications, including HTTP servers, FTP servers, CGI servers, database servers, Java servers, business applications, and the like. The server(s) also may be one or more computers which can be capable of executing programs or scripts in response to the user computers 105, 110. As one example, a server may execute one or more web applications. The web application may be implemented as one or more scripts or programs written in any programming language, such as Java™, C, C# or C++, and/or any scripting language, such as Perl, Python, or TCL, as well as combinations of any programming/scripting languages. The server(s) may also include database servers, including without limitation those commercially available from Oracle®, Microsoft®, Sybase®, IBM® and the like, which can process requests from database clients running on a user computer 105, 110.

In some embodiments, an application server may create web pages dynamically for displaying on an end-user (client) system. The web pages created by the web application server may be forwarded to a user computer 105 via a web server. Similarly, the web server can receive web page requests and/or input data from a user computer and can forward the web page requests and/or input data to an application and/or a database server. Those skilled in the art will recognize that the functions described with respect to various types of servers may be performed by a single server and/or a plurality of specialized servers, depending on implementation-specific needs and parameters.

The system 100 may also include one or more databases 135. The database(s) 135 may reside in a variety of locations. By way of example, a database 135 may reside on a storage medium local to (and/or resident in) one or more of the computers 105, 110, 115, 125, 130. Alternatively, it may be remote from any or all of the computers 105, 110, 115, 125, 130, and/or in communication (e.g., via the network 120) with one or more of these. In a particular set of embodiments, the database 135 may reside in a storage-area network ("SAN") familiar to those skilled in the art. Similarly, any necessary files for performing the functions attributed to the computers 105, 110, 115, 125, 130 may be stored locally on the respective computer and/or remotely, as appropriate. In one set of embodiments, the database 135 may be a relational database, such as Oracle 10 g, that is adapted to store, update, and retrieve data in response to SQL-formatted commands.

Figure 2:
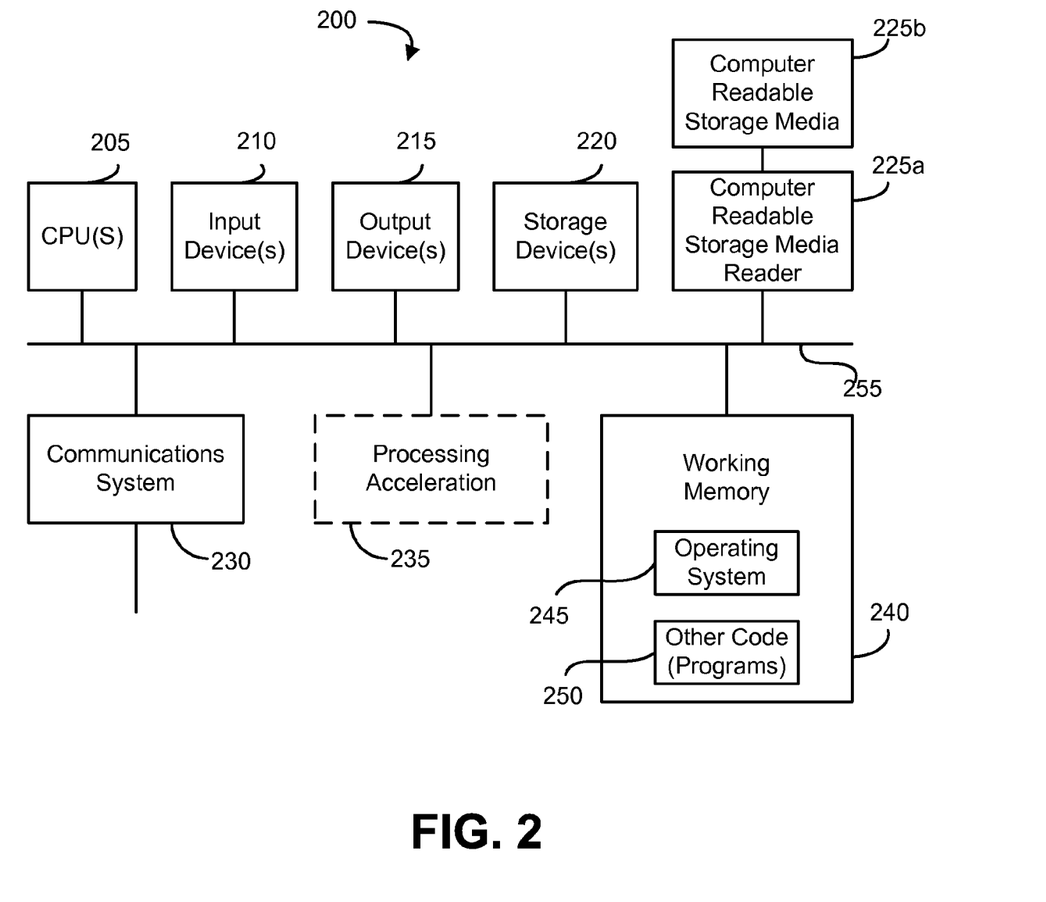
FIG. 2 is a block diagram illustrating an exemplary computer system in which embodiments of the present invention may be implemented.

FIG. 2 illustrates an exemplary computer system 200, in which various embodiments of the present invention may be implemented. The system 200 may be used to implement any of the computer systems described above. The computer system 200 is shown comprising hardware elements that may be electrically coupled via a bus 255. The hardware elements may include one or more central processing units (CPUs) 205, one or more input devices 210 (e.g., a mouse, a keyboard, etc.), and one or more output devices 215 (e.g., a display device, a printer, etc.). The computer system 200 may also include one or more storage device 220. By way of example, storage device(s) 220 may be disk drives, optical storage devices, solid-state storage device such as a random access memory ("RAM") and/or a read-only memory ("ROM"), which can be programmable, flash-updateable and/or the like.

The computer system 200 may additionally include a computer-readable storage media reader 225a, a communications system 230 (e.g., a modem, a network card (wireless or wired), an infra-red communication device, etc.), and working memory 240, which may include RAM and ROM devices as described above. In some embodiments, the computer system 200 may also include a processing acceleration unit 235, which can include a DSP, a special-purpose processor and/or the like.

The computer-readable storage media reader 225a can further be connected to a computer-readable storage medium 225b, together (and, optionally, in combination with storage device(s) 220) comprehensively representing remote, local, fixed, and/or removable storage devices plus storage media for temporarily and/or more permanently containing computer-readable information. The communications system 230 may permit data to be exchanged with the network 220 and/or any other computer described above with respect to the system 200.

The computer system 200 may also comprise software elements, shown as being currently located within a working memory 240, including an operating system 245 and/or other code 250, such as an application program (which may be a client application, web browser, mid-tier application, RDBMS, etc.). It should be appreciated that alternate embodiments of a computer system 200 may have numerous variations from that described above. For example, customized hardware might also be used and/or particular elements might be implemented in hardware, software (including portable software, such as applets), or both. Further, connection to other computing devices such as network input/output devices may be employed. Software of computer system 200 may include code 250 for implementing embodiments of the present invention as described herein.

Figure 3:
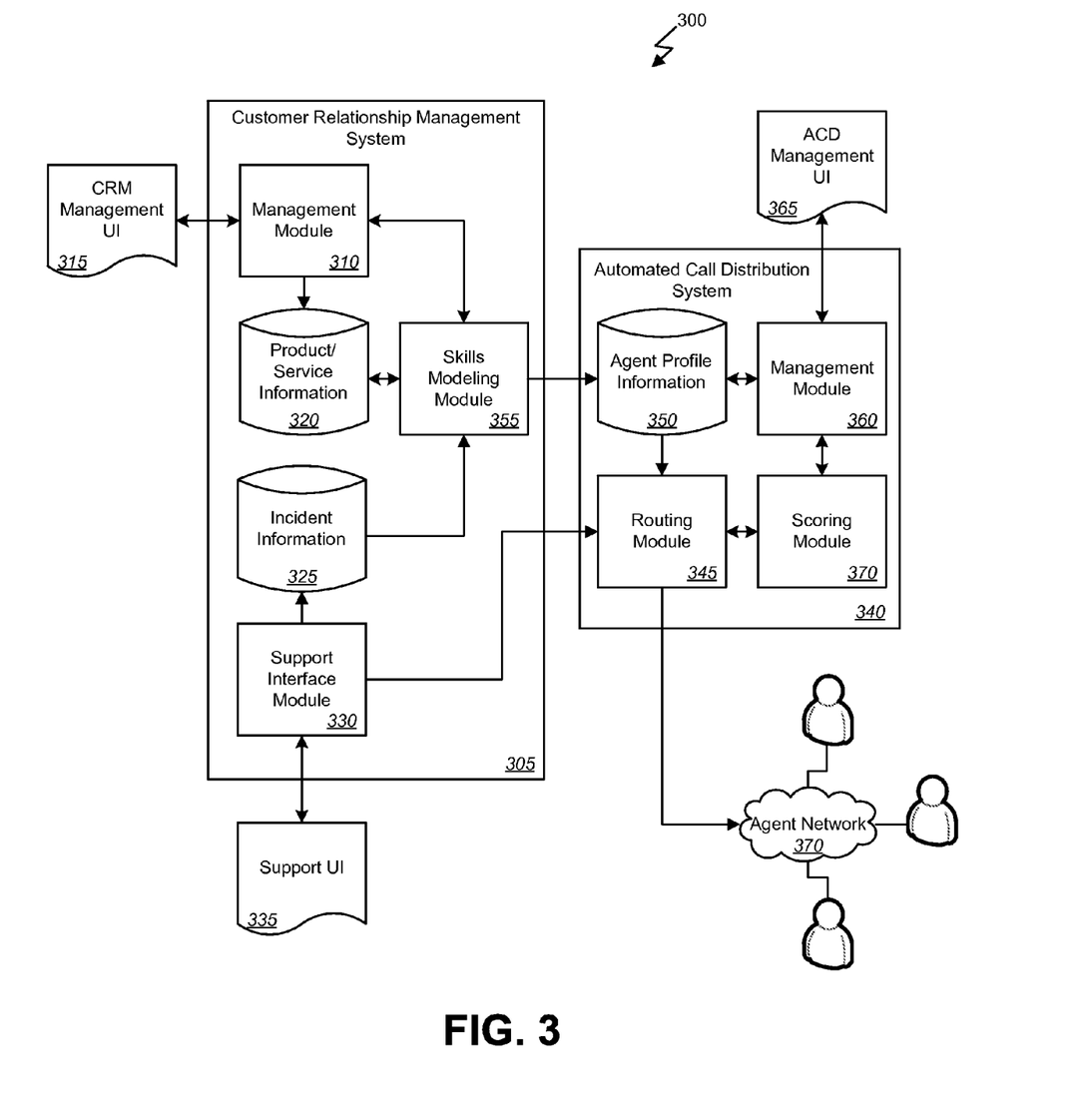
FIG. 3 is a block diagram illustrating, at a high-level, functional components of a system for modeling of agent skills based on or more closely matching categorization structures of the CRM system according to one embodiment of the present invention.

FIG. 3 is a block diagram illustrating, at a high-level, functional components of a system for modeling of agent skills based on or more closely matching categorization structures of the CRM system according to one embodiment of the present invention. In this example, the system 300 includes a Customer Relationship Management (CRM) system 305 such as may be executed on a server or another computer or computing device as described above. The CRM system 305 can include a management module 310 which provides a management user interface 315 such as a set of web pages or other interface. Through this interface 315, a supervisor, manager, administrator, etc. can interact with the management module 310 to define information 320 for products and/or services supported by the CRM system 305. Generally speaking, the product information 320 can be organized into a multi-level hierarchy of information with more general product descriptions at the top of the hierarchy and increasing specific product descriptions at lower levels of the hierarchy. For example, a top level of the hierarchy may divide products into "hardware" and "software." A next level down in the hierarchy, for example, might divide "hardware" into product groups like "server," "desktop," and "mobile device." A level below this might further divide these product groups into specific products and thus organizing general and increasingly specific product information into a logical structure. In other words, the structure of the product information 320 can comprise a multi-level hierarchy wherein lower levels of the hierarchy comprise more detailed information about the products or services than higher levels of the hierarchy.

Through the management interface 315 of the CRM system 305, the supervisor, manager, administrator, etc. can additionally or alternatively interact with the management module 310 to define information 325 for customer incidents handled by the CRM system 305. Generally speaking, the incident information 325 can be organized into a multi-level hierarchy of information much like the product information 320 with more general incident descriptions at the top of the hierarchy and increasing specific product descriptions at lower levels of the hierarchy. In other words, the structure of the incident information 325 can comprise a multi-level hierarchy that is substantially similar to the structure of the product information 320. The incident information 325 can map to the product information 320 and lower levels of the hierarchy or the incident information 325 can comprise more detailed information about the customer incidents than higher levels of the hierarchy.

The CRM system 305 can support a number of users, such as end users of a product or service, can receive requests for support or service from those users, and process those requests in order to connect or direct the requesting users to one or more agents 370 for answers to questions posed in the requests. For example, a support interface module 330 of the CRM system 305 can provide one or more interfaces 335 including but not limited to web pages, email addresses, phone lines, chat and/or instant messaging, and/or any of a variety of other communication channels to customer users of the system. Through these channels/interfaces 335, the customers can make requests for support that may include questions to be answered by the agents 370. Once received, these requests and/or questions can be evaluated by the support interface module 330 and forwarded to a routing module 345 of an Automated Call Distribution (ACD) system which can then direct the request and/or question to a selected agent with matching expertise. That is, the routing module 345 can identify an agent with a skillset that is appropriate for the nature of the request and then connect the customer with that agent through email, phone, chat and/or instant messaging, and/or any of a variety of other communication channels. It should be noted that while illustrated here as separate from the CRM system 305, the ACD system 340 and/or routing module 345 and other components thereof may, in other implementations, be part of the CRM system 305 without departing from the scope of the present invention.

As noted above, embodiments of the present invention are directed to modeling of agent skills. Typically, an agent skills model used by the ACD system 340 is different from anything in the CRM system 305. As noted above, in the CRM system 305, the product information 320 can be modeled as one or more hierarchies or tree structures. For example, the product information 320 may be modeled by a product structure and a category structure used to model a product set and types of issues that relate to that product set. These structures can be used to categorize incidents in the CRM system 305 to classify it by product and type of issue (incident type) and answers (self-service knowledge base) are categorized using the same structure. Embodiments of the present invention model agent skills using the same structure, i.e., representing skills by product and category. Using that structure to define agent skills dramatically simplifies the task of setting up skills. For example, skillsets for agents can be defined in a set of agent profile information 350 by a skills modeling module 355 and the management module 310 of the CRM system 305 presenting the structures through the CRM management interface 315 and allowing the administrator or other user to pick and assign skills to agents. Based on these models, more generic skills can be assigned to parent nodes at higher levels of the structure and more specific skills assigned to lower parents of leaf nodes of the structure. This allows definition of skills in a way that is seamless and integrated with the CRM system 305. Once assigned, the skills of the agent profile information 350 can be used by the routing module 345 to select agents as will be described in greater detail below.

Stated another way, modeling of agent skills based on or more closely matching categorization structures of the CRM system according to one embodiment of the present invention can begin with defining a set of product information 320 representing products or services for which support is available through the CRM system 305. The structure of the product information 320 can comprise a multi-level hierarchy wherein lower levels of the hierarchy comprise more detailed information about the products or services than higher levels of the hierarchy.

A set of incident information 325 representing customer incidents handled by the CRM system 305 for one or more of the products or services can also be defined. A structure of the incident information 325 can be based on the structure of the product information 320. That is, the structure of the incident information 325 can comprise a multi-level hierarchy that is substantially similar to the structure of the product information 320. The incident information 325 can map to the product information 320 and lower levels of the hierarchy or the incident information 325 can comprise more detailed information about the customer incidents than higher levels of the hierarchy.

A set of skills information 350 can be defined for each of the plurality of customer service agents 370. A structure of the skills information 350 can be based on the structure of the product information 320 and the structure of the incident information 325. The skills information 350 can be expressed in terms based on the structure of the product information 320 and the structure of the incident information 325.

In use, a user can visit the website or other interface 335 of the CRM system 305, search for answers to a question, but might not find what is needed. The user can then select or request through the interface 335 of the CRM system 305 a chat or other interactive session with an agent. The form of the website or interface 335 can ask the user to be specific as possible about the problem. Embodiments of the present invention provide for determining customer intent, i.e., a determination of the customer's intentions or desires related to the request, that enable the contact center to better anticipate the needs of the customer in order to offer more personalized service. The customer intent can be determined and expressed by the support interface module 330 in the form of a product/category combination to facilitate downstream mapping to agent skills which are best suited to serve this customer. In addition to product/category, the customer intent can also include the customer's language, again aiding agent assignment. The customer intent may be explicitly known, such as when the customer is known and their language preference is available from the customer record and/or when the customer has explicitly selected the product and/or category while searching for a solution while visiting the CRM web site. In other cases, the customer intent may be inferred, such as when the customer has recent or open incidents or when the customer has recently purchased a product. Because there are many different ways of determining customer intent, a set of rules can be configured to guide the process. Once the customer's intent is determined, embodiments of the present invention provide a way to map the specific request of the customer, based on the customer intent, to an appropriate agent skill even if that skill is mapped further up in the hierarchy of the model. That is, the routing module 345 of the ACD system 340 can select an agent by crawling up the tree(s) of the model defining the agent skills to find the best matched skills for the customer request to find an agent.

Stated another way, handling of customer communications and/or routing of incidents can begin with receiving at the support interface module 330 of the CRM system 305 information related to a customer incident and based on an interaction with a customer. A customer intent can be determined by the support interface module 330 or other element of the CRM system 305 based on the information related to the customer incident and the interaction with the customer. The customer intent can be expressed in terms based on the structure of the product information and the structure of the incident information, e.g., in terms of a product and/or category. A communication with the customer can be routed by the routing module 345 of the ACD system 340 to a selected at least one of the plurality of customer service agents 370 based on the determined customer intent and skills information 350 for the selected customer service agent.

According to one embodiment, routing by the routing module 345 of the ACD system 340 can comprise comparing the determined customer intent to the skills information 350 for the plurality of customer service agents. In response to the routing module 345 identifying an exact match between the customer intent and the skills information 350 for at least one of the plurality of customer service agents 370 based on said comparing, the at least one of the plurality of customer service agents 370 having the exact match can be selected for handling of the communication with the customer. For example, in the case where the product and category information of the customer intent both match a product and category skills definition for a particular agent, that agent can be selected for handling the customer incident and the customer can be routed to that agent via any of the different available communication channels.

In response to the routing module 345 of the ACD system 340 identifying a partial match between the customer intent and the skills information 350 for at least one of the plurality of customer service agents 370 based on said comparing, the at least one of the plurality of customer service agents can be selected by the routing module 345 of the ACD system 340 for handling of the communication with the customer having an exact match for one of product information or category information expressed in the customer intent and a best match for the other of product information or category information expressed in the customer intent. For example, in the case where one of the product and category information of the customer intent matches a product or category skills definition for a particular agent but the other information does not match, e.g., the product information of the customer intent matches a defined skill for an agent or agents but the category does not, a check can be made for a best available match at a higher level of the hierarchy of the non-matching information, e.g., checking levels of the hierarchy of the category information above the level corresponding to the matching product information, until a best available match is found. An agent can be selected for handling the customer incident based on such a match and the customer can be routed to that agent via any of the different available communication channels.

In response to the routing module 345 of the ACD system 340 identifying no match between the customer intent and the skills information 350 for at least one of the plurality of customer service agents 370 based on said comparing, the routing module 345 of the ACD system 340 can select the at least one of the plurality of customer service agents 370 for handling of the communication with the customer having a best match for product information and category information expressed in the customer intent. For example, in the case where the product and category information of the customer intent both do not match a product and category skills definition for a particular agent, a best available match can be found, perhaps based on different levels of the corresponding hierarchies, and that agent can be selected for handling the customer incident and the customer can be routed to that agent via any of the different available communication channels. According to one embodiment, this can be done using the hierarchy and a tree traversal algorithm. Another approach can be to map the detailed interaction purpose from the customer to the nearest defined skills (i.e. one of the 12-20 skills defined in the system for which agents are given scores). Then an agent who has that skill can be located. When mapping the detailed interaction purpose to a defined skill, a decision can be made as to whether to crawl up the product hierarchy first or the category hierarchy first. According to one embodiment, this decision can be based on a user configurable preference which can define the preferred approach as being "product-centric" or "category-centric".

According to one embodiment of the present invention, the ACD system 340 can also include a scoring module 370 which can provide a dynamic scorecard for agents, i.e., a direct relationship between the incident and the skill used to route that incident to that agent. For example, the scoring module 370 or other element of the ACD system 340 and/or CRM system 305 can monitor the agents as they work on different types of customer issues and can tabulate the agents' performance on an agent scorecard. Traditional skills based routing algorithms use statically defined agent skills, which may not accurately reflect the agent's performance relative to different types of issues and may be out-of-date. Embodiments of the present invention can measure the agent's actual performance or track record relative to different customer issues, providing a basis for better agent assignments.

Stated another way, the scoring module 370 of the ACD system 340 can dynamically score performance of the customer service agent in handling an incident or other communication with the customer by receiving information related to handling of a customer incident. For example, this process can be started automatically at the end of a communication with the customer, may be based on monitoring of that communication, and/or may be partially based on feedback information from the customer. A customer service agent, i.e., the agent handling the incident or other communication, can be identified by the scoring module 370 based on the received information, e.g., by name, incident number, etc. Agent skills related to handling of the incident can be determined by the scoring module 370 of the ACD system 340 based on the received information. For example, the information may identify the product and category information used to select the agent. Agent performance can be determined by the scoring module 370 of the ACD system 340 for the incident based on the received information. For example, based on customer feedback, supervisor input, automatically collected information such as total time of the communication, number of related communications to handle the incident, etc., the performance of the agent can be rated as positive, neutral, or negative based on any of a variety of possible scales or rating systems. The skills information 350 for the identified customer service agent can be updated by the scoring module 370 of the ACD system 340 based on the determined agent performance, e.g., incremented or increased for positive performance and decremented or decreased for negative performance.

Figure 4:
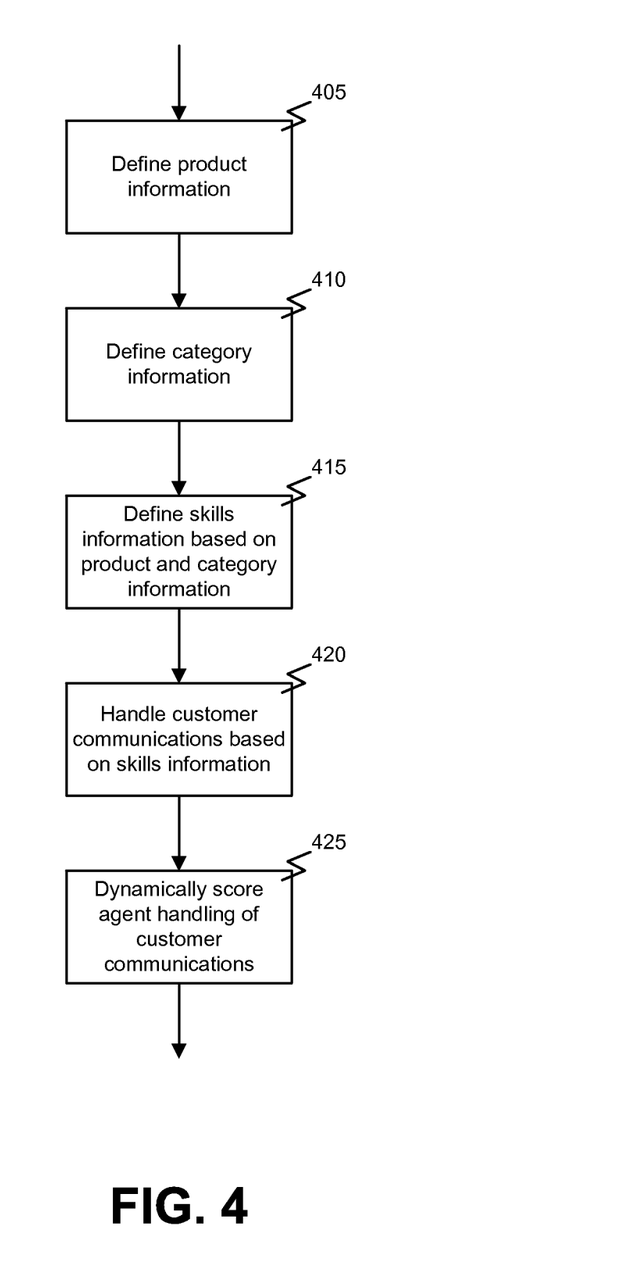
FIG. 4 is a flowchart illustrating a process for modeling of agent skills based on or more closely matching categorization structures of the CRM system according to one embodiment of the present invention.

FIG. 4 is a flowchart illustrating a process for modeling of agent skills based on or more closely matching categorization structures of the CRM system according to one embodiment of the present invention. In this example, processing can begin with defining 405 a set of product information representing products or services for which support is available through the CRM system. The structure of the product information can comprise a multi-level hierarchy wherein lower levels of the hierarchy comprise more detailed information about the products or services than higher levels of the hierarchy.

A set of incident information representing customer incidents handled by the CRM for one or more of the products or services can also be defined 410. A structure of the incident information can be based on the structure of the product information. That is, the structure of the incident information can comprise a multi-level hierarchy that is substantially similar to the structure of the product information. The incident information maps to the product information and lower levels of the hierarchy or the incident information can comprise more detailed information about the customer incidents than higher levels of the hierarchy.

A set of skills information can be defined 415 for each of the plurality of customer service agents. A structure of the skills information can be based on the structure of the product information and the structure of the incident information. The skills information can be expressed in terms based on the structure of the product information and the structure of the incident information.

Based on such definitions, customer communications and/or customer incidents can be handled by the CRM system. One exemplary embodiments of handling 420 customer incidents based on these definitions and according to one embodiment will be described in detail below with reference to FIG. 5. Additionally or alternatively, embodiments can include dynamically scoring 425 performance of a customer service agent in handling a communication with a customer. One exemplary embodiments of dynamically scoring 425 performance of a customer service agent in handling a communication with a customer will be described in detail below with reference to FIG. 6.

Figure 5:
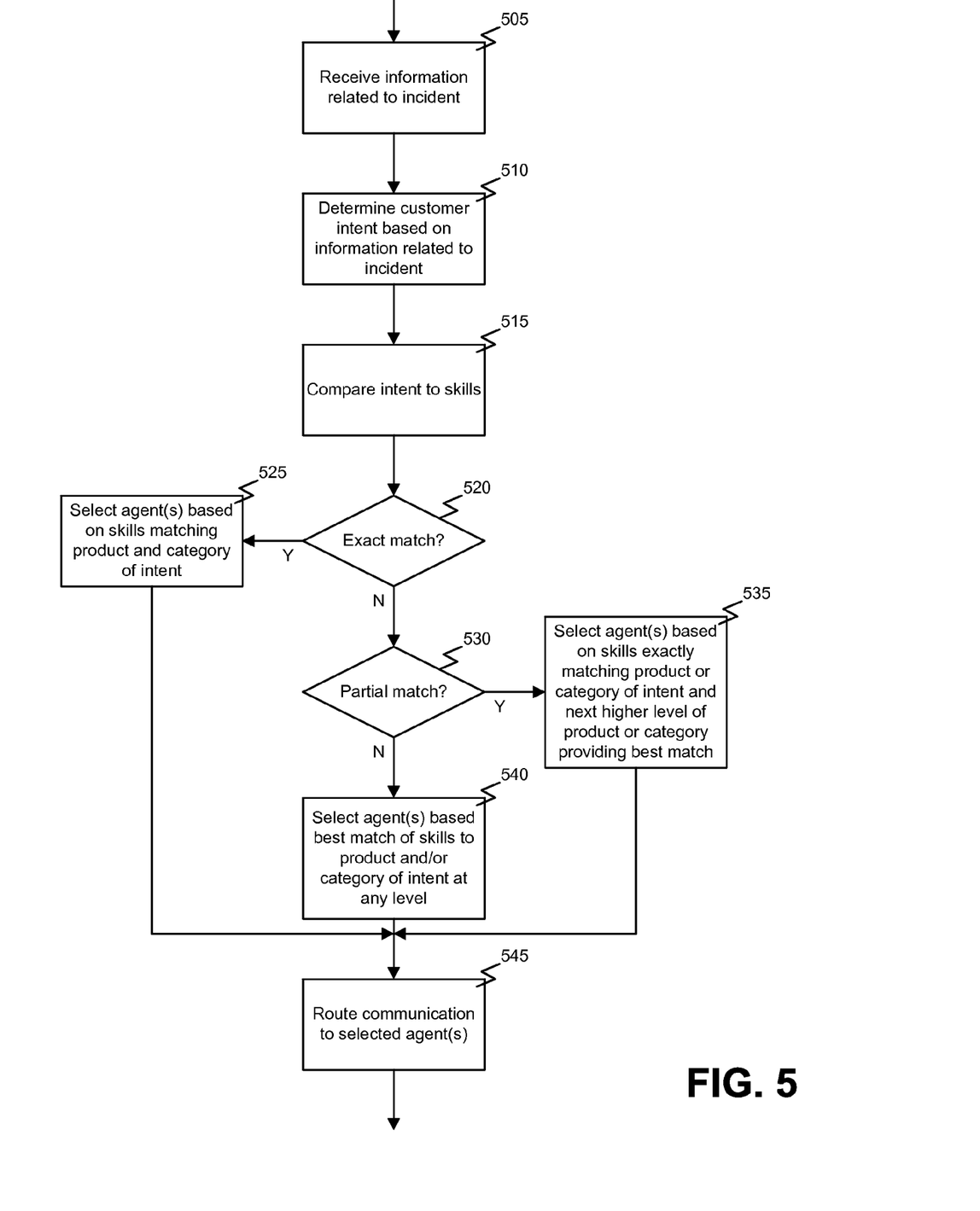
FIG. 5 is a flowchart illustrating a process for routing of incidents in a CRM system according to one embodiment of the present invention.

FIG. 5 is a flowchart illustrating a process for routing of incidents in a CRM system according to one embodiment of the present invention. In this example, handling of customer communications and/or routing of incidents can begin with receiving 505 information related to a customer incident and based on an interaction with a customer. A customer intent can be determined 510 based on the information related to the customer incident and the interaction with the customer. The customer intent can be expressed in terms based on the structure of the product information and the structure of the incident information. A communication with the customer can be routed 545 to a selected at least one of the plurality of customer service agents based on the determined customer intent and skills information for the selected customer service agent.

According to one embodiment, routing 545 can further comprise comparing 515 the determined customer intent to the skills information for the plurality of customer service agents. In response to identifying 520 an exact match between the customer intent and the skills information for at least one of the plurality of customer service agents based on said comparing, the at least one of the plurality of customer service agents having the exact match can be selected 525 for handling of the communication with the customer. For example, in the case where the product and category information of the customer intent both match a product and category skills definition for a particular agent, that agent can be selected for handling the customer incident and the customer can be routed to that agent via any of the different available communication channels.

In response to identifying 530 a partial match between the customer intent and the skills information for at least one of the plurality of customer service agents based on said comparing, the at least one of the plurality of customer service agents can be selected 535 for handling of the communication with the customer having an exact match for one of product information or category information expressed in the customer intent and a best match for the other of product information or category information expressed in the customer intent. For example, in the case where one of the product and category information of the customer intent matches a product or category skills definition for a particular agent but the other information does not match, e.g., the product information of the customer intent matches a defined skill for an agent or agents but the category does not), a check can be made for a best available match at a higher level of the hierarchy of the non-matching information, e.g., checking levels of the hierarchy of the category information above the level corresponding to the matching product information, until a best available match is found. An agent can be selected for handling the customer incident based on such a match and the customer can be routed to that agent via any of the different available communication channels. According to one embodiment, this can be done using the hierarchy and a tree traversal algorithm. Another approach can be to map the detailed interaction purpose from the customer to the nearest defined skills (i.e. one of the 12-20 skills defined in the system for which agents are given scores). Then an agent who has that skill can be located. When mapping the detailed interaction purpose to a defined skill, a decision can be made as to whether to crawl up the product hierarchy first or the category hierarchy first. According to one embodiment, this decision can be based on a user configurable preference which can define the preferred approach as being "product-centric" or "category-centric".

In response to identifying 520 and 530 no match between the customer intent and the skills information for at least one of the plurality of customer service agents based on said comparing, selecting 540 the at least one of the plurality of customer service agents for handling of the communication with the customer having a best match for product information and category information expressed in the customer intent. For example, in the case where the product and category information of the customer intent both do not match a product and category skills definition for a particular agent, a best available match can be found, perhaps based on different levels of the corresponding hierarchies, and that agent can be selected for handling the customer incident and the customer can be routed to that agent via any of the different available communication channels.

Figure 6:
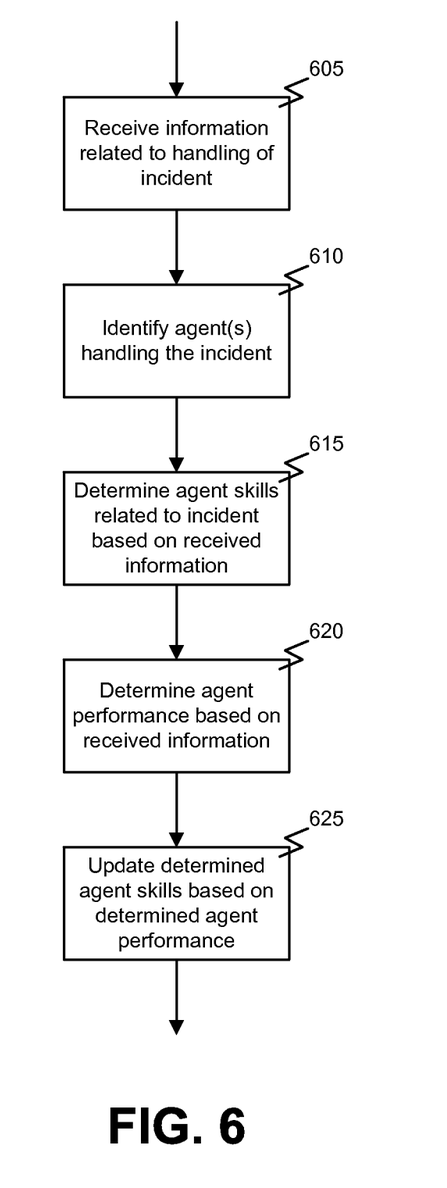
FIG. 6 is a flowchart illustrating a process for scoring of incident handling in a CRM system according to one embodiment of the present invention.

FIG. 6 is a flowchart illustrating a process for scoring of incident handling in a CRM system according to one embodiment of the present invention. As illustrated in this example, dynamically scoring performance of the customer service agent in handling the incident or other communication with the customer can comprise receiving 605 information related to handling of a customer incident. For example, this process can be started automatically at the end of a communication with the customer, may be based on monitoring of that communication, and/or may be partially based on feedback information from the customer. A customer service agent, i.e., the agent handling the incident or other communication, can be identified 610 based on the received information. Agent skills related to handling of the incident can be determined 615 based on the received information. For example, the information may identify the product and category information used to select the agent. Agent performance can be determined 620 for the incident based on the received information. For example, based on customer feedback, supervisor input, automatically collected information such as total time of the communication, number of related communications to handle the incident, etc., the performance of the agent can be rated as positive, neutral, or negative based on any of a variety of possible scales or rating systems. The skills information for the identified customer service agent can be updated 625 based on the determined agent performance, e.g., incremented or increased for positive performance and decremented or decreased for negative performance.

In the foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

While illustrative and presently preferred embodiments of the invention have been described in detail herein, it is to be understood that the inventive concepts may be otherwise variously embodied and employed, and that the appended claims are intended to be construed to include such variations, except as limited by the prior art.

What is claimed is:

1. A method for defining skills of each of a plurality of customer service agents in a Customer Relationship Management (CRM) system, the method comprising:

defining, by a computer system, a set of product information representing products or services for which support is available through the CRM system and a multi-level hierarchical structure for the set of product information;

defining, by the computer system, a set of incident information representing customer incidents handled by the CRM for one or more of the products or services and a multi-level hierarchical structure for the set of incident information based on the multi-level hierarchical structure of the product information, wherein the structure of the incident information is substantially similar to the structure of the product information and wherein the hierarchy of the incident information maps to the hierarchy of the product information;

defining, by the computer system, a set of skills information for each of the plurality of customer service agents and a multi-level hierarchical structure for the set of skills information based on the multi-level hierarchical structure of the product information and the multi-level hierarchical structure of the incident information, and wherein the structure of the skills information is substantially similar to the structure of the product information and wherein the hierarchy of the skills information maps to the hierarchy of the product information; and routing, by the computer system, a customer contact to one of the plurality of customer service agents based on the mapping of the hierarchy of the incident information and the hierarchy of the skills information maps to the hierarchy of the product information.

2. The method of claim 1, wherein lower levels of the hierarchy of the product information comprise more detailed information about the products or services than higher levels of the hierarchy.

3. The method of claim 2, wherein lower levels of the hierarchy of the incident information comprise more detailed information about the customer incidents than higher levels of the hierarchy.

4. The method of claim 3, further comprising:
receiving, by the computer system, information related to a customer incident based on an interaction with a customer;
determining, by the computer system, a customer intent based on the information related to the customer incident and the interaction with the customer, wherein the customer intent is expressed in terms based on the structure of the product information and the structure of the incident information; and
routing, by the computer system, a communication with the customer to a selected at least one of the plurality of customer service agents based on the determined customer intent and skills information for the selected customer service agent.

5. The method of claim 4, wherein routing comprises:
comparing the determined customer intent to the skills information for the plurality of customer service agents;
in response to identifying an exact match between the customer intent and the skills information for at least one of the plurality of customer service agents based on said comparing, selecting the at least one of the plurality of customer service agents having the exact match for handling of the communication with the customer;
in response to identifying a partial match between the customer intent and the skills information for at least one of the plurality of customer service agents based on said comparing, selecting the at least one of the plurality of customer service agents for handling of the communication with the customer having an exact match for one of product information or category information expressed in the customer intent and a best match for the other of product information or category information expressed in the customer intent; and
in response to identifying no match between the customer intent and the skills information for at least one of the plurality of customer service agents based on said comparing, selecting the at least one of the plurality of customer service agents for handling of the communication with the customer having a best match for product information and category information expressed in the customer intent.

6. The method of claim 3, further comprising dynamically scoring, by the computer system, performance of a customer service agent in handling a communication with a customer.

7. The method of claim 6, wherein dynamically scoring performance of the customer service agent in handling the communication with the customer comprises:
receiving information related to handling of a customer incident;
identifying a customer service agent based on the received information;
determining agent skills related to handling of the incident based on the received information;
determining agent performance based for the incident based on the received information; and
updating the skills information for the identified customer service agent based on the determined agent performance.

8. A system comprising:
a processor; and
a memory coupled with and readable by the processor and storing therein a set of instructions which, when executed by the processor, cause the processor to define skills of each of a plurality of customer service agents in a Customer Relationship Management (CRM) system by:
defining a set of product information representing products or services for which support is available through the CRM system and a multi-level hierarchical structure for the set of product information;
defining a set of incident information representing customer incidents handled by the CRM for one or more of the products or services and a multi-level hierarchical structure for the set of incident information based on the multi-level hierarchical structure of the product information, wherein the structure of the incident information is substantially similar to the structure of the product information and wherein the hierarchy of the incident information maps to the hierarchy of the product information;
defining a set of skills information for each of the plurality of customer service agents and a multi-level hierarchical structure for the set of skills information based on the multi-level hierarchical structure of the product information and the multi-level hierarchical structure of the incident information, and wherein the structure of the skills information is substantially similar to the structure of the product information and wherein the hierarchy of the skills information maps to the hierarchy of the product information; and
routing a customer contact to one of the plurality of customer service agents based on the mapping of the hierarchy of the incident information and the hierarchy of the skills information maps to the hierarchy of the product information.

9. The system of claim 8, wherein lower levels of the hierarchy of the product information comprise more detailed information about the products or services than higher levels of the hierarchy.

10. The system of claim 9, wherein lower levels of the hierarchy of the incident information comprise more detailed information about the customer incidents than higher levels of the hierarchy.

11. The system of claim 10, further comprising:
receiving information related to a customer incident based on an interaction with a customer;
determining a customer intent based on the information related to the customer incident and the interaction with the customer, wherein the customer intent is expressed in terms based on the structure of the product information and the structure of the incident information; and
routing a communication with the customer to a selected at least one of the plurality of customer service agents based on the determined customer intent and skills information for the selected customer service agent.

12. The system of claim 10, wherein routing comprises:
comparing the determined customer intent to the skills information for the plurality of customer service agents;

in response to identifying an exact match between the customer intent and the skills information for at least one of the plurality of customer service agents based on said comparing, selecting the at least one of the plurality of customer service agents having the exact match for handling of the communication with the customer;

in response to identifying a partial match between the customer intent and the skills information for at least one of the plurality of customer service agents based on said comparing, selecting the at least one of the plurality of customer service agents for handling of the communication with the customer having an exact match for one of product information or category information expressed in the customer intent and a best match for the other of product information or category information expressed in the customer intent; and in response to identifying no match between the customer intent and the skills information for at least one of the plurality of customer service agents based on said comparing, selecting the at least one of the plurality of customer service agents for handling of the communication with the customer having a best match for product information and category information expressed in the customer intent.

13. The system of claim 10, further comprising dynamically scoring performance of a customer service agent in handling a communication with a customer by:
   receiving information related to handling of a customer incident;
   identifying a customer service agent based on the received information;
   determining agent skills related to handling of the incident based on the received information;
   determining agent performance based for the incident based on the received information; and
   updating the skills information for the identified customer service agent based on the determined agent performance.

14. A computer-readable memory comprising a set of instructions stored thereon which, when executed by a processor, cause the processor to define skills of each of a plurality of customer service agents in a Customer Relationship Management (CRM) system by:
   defining a set of product information representing products or services for which support is available through the CRM system and a multi-level hierarchical structure for the set of product information;
   defining a set of incident information representing customer incidents handled by the CRM for one or more of the products or services and a multi-level hierarchical structure for the set of incident information based on the multi-level hierarchical structure of the product information, wherein the structure of the incident information is substantially similar to the structure of the product information and wherein the hierarchy of the incident information maps to the hierarchy of the product information;
   defining a set of skills information for each of the plurality of customer service agents and a multi-level hierarchical structure for the set of skills information based on the multi-level hierarchical structure of the product information and the multi-level hierarchical structure of the incident information, and wherein the structure of the skills information is substantially similar to the structure of the product information and wherein the hierarchy of the skills information maps to the hierarchy of the product information; and
   routing a customer contact to one of the plurality of customer service agents based on the mapping of the hierarchy of the incident information and the hierarchy of the skills information maps to the hierarchy of the product information.

15. The computer-readable memory of claim 14, wherein lower levels of the hierarchy of the product information comprise more detailed information about the products or services than higher levels of the hierarchy.

16. The computer-readable memory of claim 15, wherein lower levels of the hierarchy of the incident information comprise more detailed information about the customer incidents than higher levels of the hierarchy.

17. The computer-readable memory of claim 16, further comprising:
   receiving information related to a customer incident based on an interaction with a customer;
   determining a customer intent based on the information related to the customer incident and the interaction with the customer, wherein the customer intent is expressed in terms based on the structure of the product information and the structure of the incident information; and
   routing a communication with the customer to a selected at least one of the plurality of customer service agents based on the determined customer intent and skills information for the selected customer service agent.

18. The computer-readable memory of claim 17, wherein routing comprises:
   comparing the determined customer intent to the skills information for the plurality of customer service agents;
   in response to identifying an exact match between the customer intent and the skills information for at least one of the plurality of customer service agents based on said comparing, selecting the at least one of the plurality of customer service agents having the exact match for handling of the communication with the customer;
   in response to identifying a partial match between the customer intent and the skills information for at least one of the plurality of customer service agents based on said comparing, selecting the at least one of the plurality of customer service agents for handling of the communication with the customer having an exact match for one of product information or category information expressed in the customer intent and a best match for the other of product information or category information expressed in the customer intent; and
   in response to identifying no match between the customer intent and the skills information for at least one of the plurality of customer service agents based on said comparing, selecting the at least one of the plurality of customer service agents for handling of the communication with the customer having a best match for product information and category information expressed in the customer intent.

19. The computer-readable memory of claim 16, further comprising dynamically scoring performance of a customer service agent in handling a communication with a customer by:
   receiving information related to handling of a customer incident;
   identifying a customer service agent based on the received information;
   determining agent skills related to handling of the incident based on the received information;
   determining agent performance based for the incident based on the received information; and updating the skills information for the identified customer service agent based on the determined agent performance.

\* \* \* \* \*